United States Patent [19]

Headley et al.

[11] Patent Number: 5,683,107
[45] Date of Patent: Nov. 4, 1997

[54] CONTAINER OF VEHICLE AIR BAG INFLATOR HAVING FLUID WITH COMBUSTIBLE PORTION

[75] Inventors: Paul S. Headley, Mesa; Mitchell P. Zakula, Tempe, both of Ariz.

[73] Assignee: TRW Inc., Lyndhurst, Ohio

[21] Appl. No.: 640,539

[22] Filed: May 2, 1996

[51] Int. Cl.[6] .................................................. B60R 21/28
[52] U.S. Cl. .......................................................... 280/741
[58] Field of Search ...................................... 280/736, 737, 280/741

[56] References Cited

U.S. PATENT DOCUMENTS

| | | | |
|---|---|---|---|
| 3,972,545 | 8/1976 | Kirchoff et al. | 280/741 |
| 5,257,817 | 11/1993 | Cuevas | 280/736 |
| 5,348,344 | 9/1994 | Blumenthal et al. | 280/737 |
| 5,441,302 | 8/1995 | Johnson et al. | 280/736 |
| 5,464,247 | 11/1995 | Rizzi et al. | 280/741 |
| 5,470,104 | 11/1995 | Smith et al. | 280/741 |

*Primary Examiner*—Kenneth R. Rice
*Attorney, Agent, or Firm*—Tarolli, Sundheim, Covell, Tummino & Szabo

[57] ABSTRACT

An apparatus (20) for inflating an inflatable vehicle occupant protection device (22) comprises a container (60) which defines a chamber (62) for storing gas for inflating the protection device. Fluid is in the chamber (62) and comprises a combustible fuel gas. The container (60) includes an inner housing (64) comprising an inner member (80) extending along an axis (A). The inner member (80) has a first surface portion defining the chamber (62). A second surface portion (180) of the inner member 80 defines at least a portion of the periphery of the inner member (80) extending along the axis (A). An outer housing (66) comprises an outer member (84) with a third surface portion (182) engaging and supporting the second surface portion (180) of the inner member (40) over its axial and circumferential extent. An igniter (100) ignites the fuel gas to create heat. An opening (220) in the outer housing (66) directs gas from the chamber (62) to inflate the protection device (22).

26 Claims, 4 Drawing Sheets

CONTAINER OF VEHICLE AIR BAG INFLATOR HAVING FLUID WITH COMBUSTIBLE PORTION

BACKGROUND OF THE INVENTION

1. Technical Field

The present invention relates to an inflator for an inflatable vehicle occupant protection device.

2. Description of the Prior Art

Inflators for inflating inflatable vehicle occupant protection devices, such as air bags, are known. One known inflator includes a container for storing a mixture of gases under pressure. The mixture of gases includes a combustible fuel gas, such as hydrogen. The fuel gas is chemically reactive with certain materials, such as carbon steel. The chemical reaction can result in undesirable embrittlement of the container if the container is made of carbon steel.

To protect the container from chemically reacting with the combustible fuel gas in the mixture of gases, the container could be made from a metal material that is chemically unreactive with the combustible fuel gas of the mixture of gases. It has also been suggested to provide a container with a glass liner. Such a glass liner may, however, be susceptible to breakage during assembly or handling of the container.

SUMMARY OF THE INVENTION

The present invention is directed to an apparatus for inflating an inflatable vehicle occupant protection device. The apparatus comprises means for storing gas for inflating the protection device. The gas storing means includes a container which defines a chamber for fluid. The fluid includes a combustible fuel gas. The container includes an inner housing. The inner housing has an inner member which extends along an axis. The inner member has a first surface portion defining the chamber and a second surface portion defining at least a portion of the periphery of the inner member. The second surface portion extends along the axis of the inner member. An outer housing comprises an outer member with a third surface portion which engages and supports the second surface portion of the inner member over its axial and circumferential extents. The apparatus also comprises means for igniting the fuel gas to create heat in the chamber and means for directing gas from the chamber to the protection device. The inner member is preferably made from either stainless steel or aluminum. The outer member is preferably made from carbon steel.

The inner member comprises a tubular portion extending along the axis of the inner member and a closed end portion formed as one piece with the tubular portion. The inner member also comprises a portion which ruptures in response to pressure in the chamber increasing to a predetermined pressure due to the heat created by ignition of the fuel gas. The outer member comprises a tubular portion which engages and supports the tubular portion of the inner member. The outer housing also comprises a wall which engages and supports the closed end portion of the inner member.

The inner member has a nominal first thickness. The outer member has a nominal second thickness which is at least 1.5 times the first thickness. The first thickness is preferably not greater than about 1.0 mm and the second thickness is at least about 1.5 mm. A portion of one of the inner and outer housings is deformed to engage a portion of the other of the inner and outer housings to maintain the inner and outer housings in a predetermined relative position.

BRIEF DESCRIPTION OF THE DRAWINGS

Further features and advantages of the present invention will become apparent to those skilled in the art to which the present invention relates from reading the following specification with reference to the accompanying drawings, in which.

DESCRIPTION OF A PREFERRED EMBODIMENT

Figure 1:
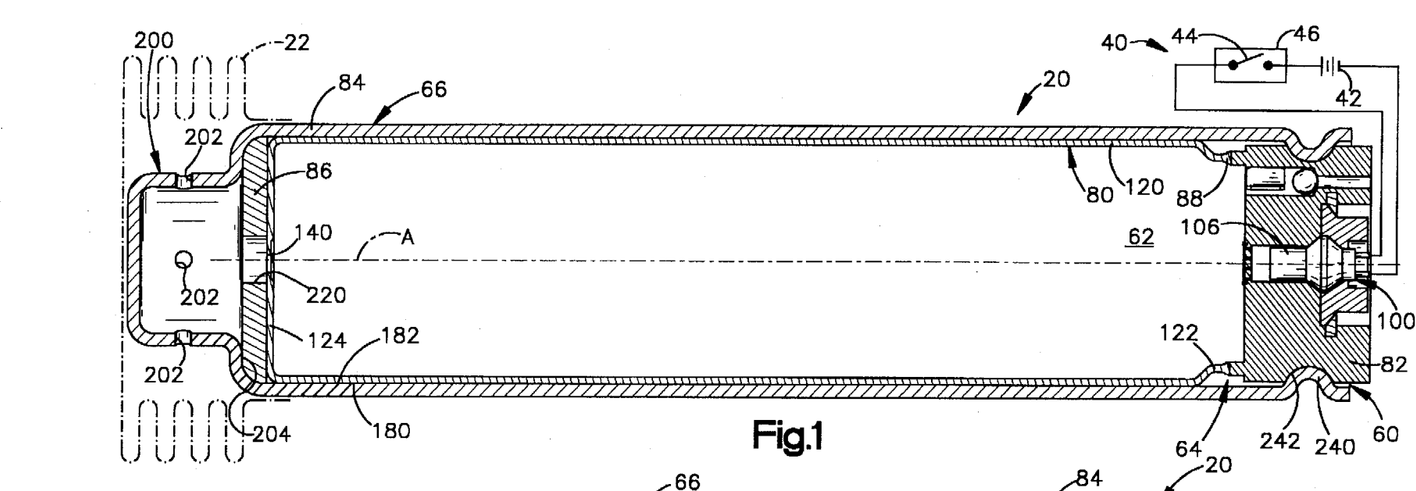
FIG. 1 is a schematic sectional view of one embodiment of an air bag inflator constructed according to the present invention.

An inflator 20 is illustrated in FIG. 1. The inflator 20 is actuatable to inflate an inflatable vehicle occupant protection device, such as an air bag 22, which is connected with the inflator. The inflator 20 and air bag 22 are suitable for use in a side impact vehicle occupant protection system and can be mounted in a door, seat or side of the vehicle. It should be apparent that the inflator 20 can also be used in a front impact protection system for a vehicle driver or vehicle passenger. It should also be apparent that the inflator 20 can be used in another type of occupant protection device, such as an inflatable seat belt.

The air bag 22 is inflatable from an uninflated and stored condition, illustrated in FIG. 1, to an inflated condition. During inflation, the air bag 22 inflates into a position between a part of the vehicle and a vehicle occupant.

The inflator 20 is connected to an electrical actuation circuit 40. The circuit 40 includes a power source 42, which is preferably a battery of the vehicle or a capacitor, and a normally open switch 44. The switch 44 is part of a sensor 46 which senses a condition requiring air bag deployment, such as a side impact against the vehicle or sudden vehicle deceleration above a predetermined deceleration. The switch 44 closes to conduct electrical power to the inflator 20. The inflator 20 is thus actuated to inflate the air bag 22 to help protect an occupant of the vehicle.

The inflator 20 includes a cylindrical container 60 which has a longitudinal central axis A and defines a chamber 62. A fluid is stored in the chamber 62 under pressure. The fluid preferably comprises a mixture of gases which includes a combustible fuel gas, an oxidizer gas for supporting combustion of the fuel gas, and an inert gas. The fuel gas is preferably about 16 molar percent hydrogen. The oxidizer gas is preferably about 30 molar percent oxygen. The inert gas comprises the remainder of the mixture of gases. The inert gas and oxygen could be provided by dry air.

The mixture of gases is stored in the chamber 62 at a room temperature pressure of at least about 4,000 psi and is preferably about 4,500 psi. The fuel gas and oxidizer gas in the mixture of gases burn to generate heat which increases the pressure in the chamber 62. The fuel gas is totally consumed by combustion. The air bag 22 is inflated by the inert gas, combustion products and any remaining unconsumed oxidizer gas in the mixture of gases.

The container 60 includes an inner housing 64 and an outer housing 66. The inner housing 64 includes a tubular inner shell 80 that is closed at one end and an end cap 82. An open end of the inner shell 80 is fixed to an annular projection 87 (FIG. 3) on the end cap 82 by a friction weld 88. The inner shell 80 and end cap 82 cooperate to define the chamber 62 in which the mixture of gases is stored.

The annular projection 87 is spaced radially inward from the outer periphery of the end cap 82 to define a clearance region 89. The friction weld 88 provides a continuous hermetic seal between the inner shell 80 and the end cap 82. Some flash results at the weld 88 which extends outward into the clearance region 89 but does not extend far enough to contact the outer housing 66. The flash thus does not interfere with the outer housing 66 when the inner housing 64 is moved within the outer housing during an assembly operation. The annular projection 87 also serves to localize the heat from the weld 88 which is generated during a friction welding operation.

An igniter 100 is supported by the end cap 82. The igniter 100 is a known type of igniter that is connected to the circuit 40 and is actuatable upon receiving an electrical signal from the circuit. The igniter 100 is held in the end cap 82 by a flanged retainer 102 (FIG. 3) and a lock ring 104. The lock ring 104 has an innermost radial portion which engages the radially projecting flange of the retainer 102. The lock ring 104 has an outermost radial portion which is received in a groove 106 in the end cap 82. The lock ring 104 thus holds the retainer 102 in the end cap 82, and the retainer holds the igniter 100 in the end cap.

Figure 2:
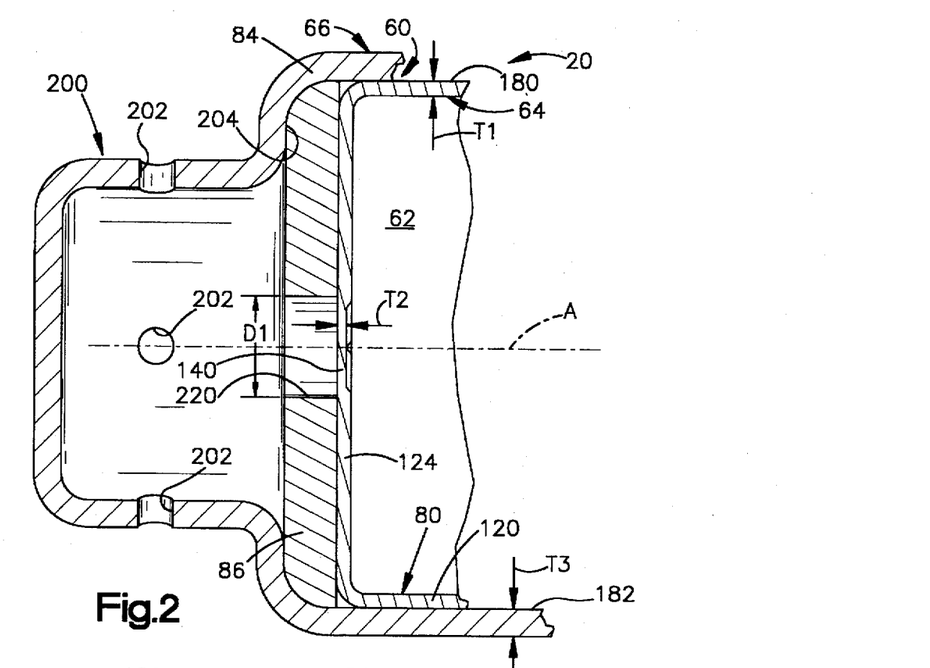
FIG. 2 is an enlarged view of an end portion of the inflator of FIG. 1.

The inner shell 80 is made from a material which is chemically unreactive with the hydrogen fuel gas in the mixture of gases in the chamber 62. The inner shell 80 is preferably made from stainless steel or aluminum. The inner shell 80 includes a tubular portion or wall 120 with an end 122, to the right as viewed in FIGS. 1 and 3, which is open prior to being welded to the end cap 82. The other end of the inner shell 80, to the left as viewed in FIGS. 1 and 2, is closed by an end wall 124. The end wall 124 of the inner shell 80 is formed in one piece with the tubular wall 120 during a drawing operation. The inner shell 80 has a nominal thickness T1, as illustrated in FIG. 2, which is no greater than about 1.0 mm (0.039 inch) and is preferably about 0.81 mm (0.032 inch).

The end wall 124 of the inner shell 80 has a rupturable central portion 140 (FIG. 2). The central portion 140 may be stamped to have a thickness T2 which is less than the nominal thickness T1 of the remainder of the inner shell 80 or scored to have weakened areas. The central portion 140 of the end wall 124 of the inner shell 80 ruptures in response to pressure in the chamber 62 increasing to a predetermined pressure. The predetermined pressure is approximately at least twice the room temperature pressure at which the mixture of gases is stored and is preferably about 10,000 psi.

The end cap 82 (FIG. 3) is also made from a material that is chemically unreactive with the hydrogen fuel gas in the mixture of gases. The end cap 82 is preferably made from aluminum or stainless steel. The end cap 82 includes a fill port 142 that is closed by a spherical member 144. The spherical member 144 engages a shoulder 146 in the fill port 142 to close the fill port after the chamber 62 is filled with the mixture of gases.

Figure 3:
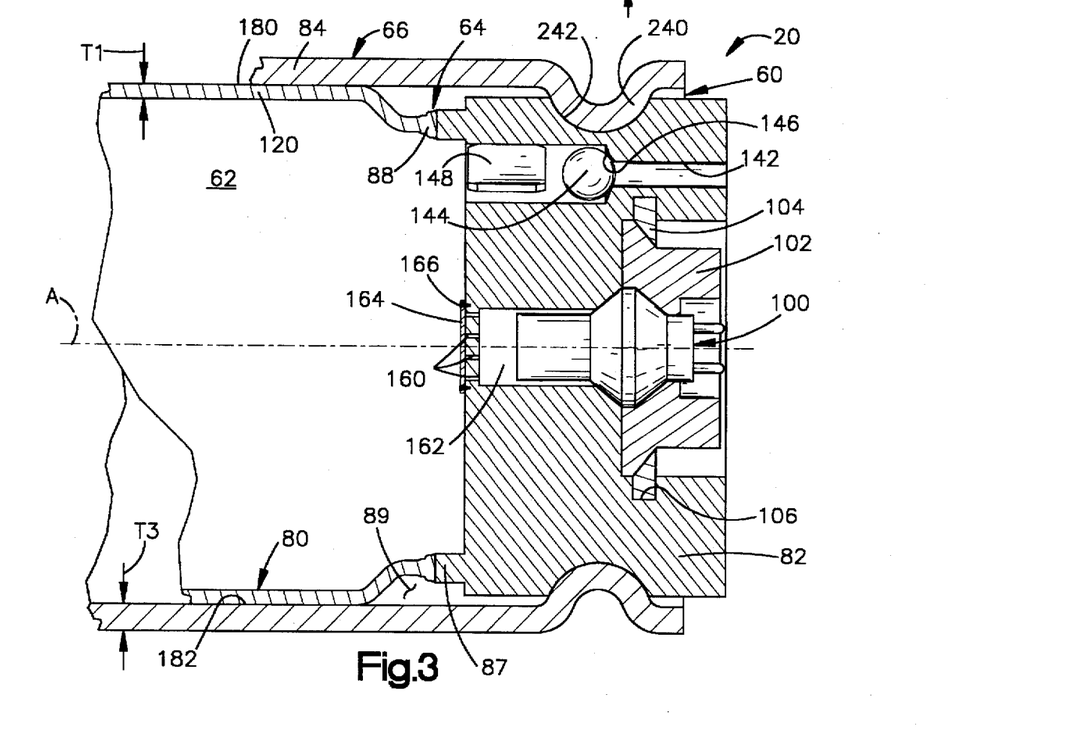
FIG. 3 is an enlarged view of another end portion of the inflator of FIG. 1.

The chamber 62 is preferably filled with the mixture of gases before the inner housing 64 is placed inside of the outer housing 66. When the chamber 62 is being filled with the mixture of gases through the fill port 142, the spherical member 144 is spaced from the shoulder 146 by pressure from a source (not shown) of gas communicating with the fill port 142. The pressure of the gas from the source acting on the right side of the spherical member 144, as viewed in FIG. 3, is greater than the pressure in the chamber 62 which acts on the left side of the spherical member. The spherical member 144 is thus urged to move in a direction towards the chamber 62 until it engages a stop 148 fixed in the fill port 142. The stop 148 retains the spherical member in the fill port while allowing gas to flow around the spherical member and the stop. When the source of gas is disconnected from the fill port 142, the pressure in the chamber 62, which acts on the left side of the spherical member 144, as viewed in FIG. 3, is significantly greater than the pressure acting on the right side. This pressure urges the spherical member 144 away from the stop 148 and against the shoulder 146 to seal the fill port 142.

The end cap 82 includes a plurality of flow passages 160 for fluidly communicating a chamber 162 (FIG. 3) in the end cap with the chamber 62. The flow passages 160 are covered by a relatively thin metal member 164. The member 164 extends across all of the flow passages 160 to block fluid flow between the chambers 62 and 162. The member 164 is welded to the end cap 82 by a continuous circumferential weld 166, such as a laser weld, which hermetically seals the fluid storage chamber 62 from the chamber 162. The igniter 100 includes a portion which is located in the chamber 162.

A side surface of the member 164, to the right as viewed in FIG. 3, engages and is supported by the end cap 82. The greatest distance that the member 164 must span is across the diameter of each flow passage 160. The member 164 can withstand relatively high pressure of the mixture of gases in the chamber 62 acting on the left side surface of the member, as viewed in FIG. 3, without rupturing because only relatively small areas of the member are unsupported and are spaced apart. The member 164 ruptures when pressure in the chamber 162 from actuation of the igniter 100 acts on the right side surface of the member, as viewed in FIG. 3. The member 164 ruptures because pressure in the chamber 162 acting on the right side surface of the member 164, as viewed in FIG. 3, initially forces the member away a small distance from the end cap 82. The member 164 is supported only at the weld 166 and a relatively large area inside of the weld is unsupported. Pressure within the chamber 162 ruptures the unsupported area of the member 164.

The outer housing 66 includes a tubular outer shell 84 and a separate reinforcing wall 86. The outer shell 84 of the outer housing 66 is preferably made from a relatively strong, easily workable and relatively low cost material, such as carbon steel. The outer shell 84 is formed into a size and shape which fits closely over the inner shell 80. The outer shell 84 has a nominal thickness T3 (FIG. 2) which is approximately at least 1.5 times the nominal thickness T1 of the inner shell 80. The thickness T3 of the outer shell 84 is preferably at least 1.5 mm (0.059 inch). The outer shell 84 could also be formed from a molded or wrapped fiber reinforcing material, such as Kevlar, supported in a matrix material.

The inner shell 80 has a cylindrical outer surface 180 (FIGS. 1–3) which extends along and around the axis A. The outer shell 84 has a cylindrical inner surface 182. When the mixture of gases is stored under pressure in the chamber 62, the cylindrical inner surface 182 of the outer shell 84 engages the cylindrical outer surface 180 of the inner shell 80 over substantially all of the axial and circumferential extents of the outer surface of the inner shell. The load acting on the tubular wall 120 of the inner shell 80 over the inner surface of the inner shell due to pressure in the chamber thus 62 of the inner housing 64 is thus partially born by the outer housing 66.

It will be apparent that the inner shell 80 and the outer shell 84 can be formed to have shapes other than cylindrical. However, the shapes will be similar to each other, and the outer shell 84 will have an inner surface 182 which abuts, engages and reinforces the outer surface 180 of the inner shell 80 over its peripheral extents.

The outer shell 84 of the outer housing 66 is formed in a drawing operation and includes a smaller diameter end portion, to the left as viewed in FIGS. 1 and 2, which comprises a diffuser portion 200. The diffuser portion 200 of the outer shell 84 includes a plurality of outlet openings 202 which direct fluid from the chamber 62 into the air bag 22 to inflate the air bag. The outer shell 84 also includes an annular shoulder 204 that extends radially inward adjacent the diffuser portion 200.

The reinforcing wall 86 of the outer housing 66 is disposed inside the outer shell 84 and engages the shoulder 204 of the outer shell. The shoulder 204 supports the reinforcing wall 86 so that it provides an inner end surface of the outer housing 66 which supports the end wall 124 of the inner shell 80. The reinforcing wall 86 also limits movement of the inner housing 64 in a direction to the left, as viewed in FIG. 2, relative to the outer shell 84 and the outer housing 66. The reinforcing wall 86 may be made of any suitable material, such as carbon steel.

A central opening 220 is formed in the reinforcing wall 86 of the outer housing 66 along the axis A of the container 60. The opening 220 in the reinforcing wall 86 is aligned with the rupturable central portion 140 of the end wall 124 and thus the reinforcing wall does not support the central portion of the end wall. The opening 220 has a predetermined diameter D1 which defines the rupturable area of the central portion 140 of the end wall 124. The reinforcing wall 86 thus engages and supports the end wall 124 of the inner shell 80 to assure that only the central portion 140 of the wall 35 ruptures when pressure in the chamber 62 increases to the predetermined pressure. Fluid flows from the chamber 62 through the opening 220 in the reinforcing wall 86 after the central portion 140 of the inner shell 80 ruptures. The fluid is directed into the diffuser portion 200 of the outer shell 84 and then into the air bag 22.

An end portion 240 of the outer shell 84, to the right as viewed in FIG. 3, is deformed to fit into a groove 242 in the end cap 82 of the inner housing 64. The engagement between the deformed end portion 240 of the outer shell 84 and the surface defining the groove 242 in the end cap 82 blocks the inner housing 64 from moving relative to the outer housing 66. The deformed end portion 240 and the groove 242 thus maintain the inner housing 64 in a desired relative position within the outer housing 66. The deformed end portion 240 and the groove 242 also maintain the end wall 124 of the inner shell 80 engaged with the reinforcing wall 86 and the reinforcing wall 86 engaged with the annular shoulder 204 of the outer shell 84.

Figure 4:
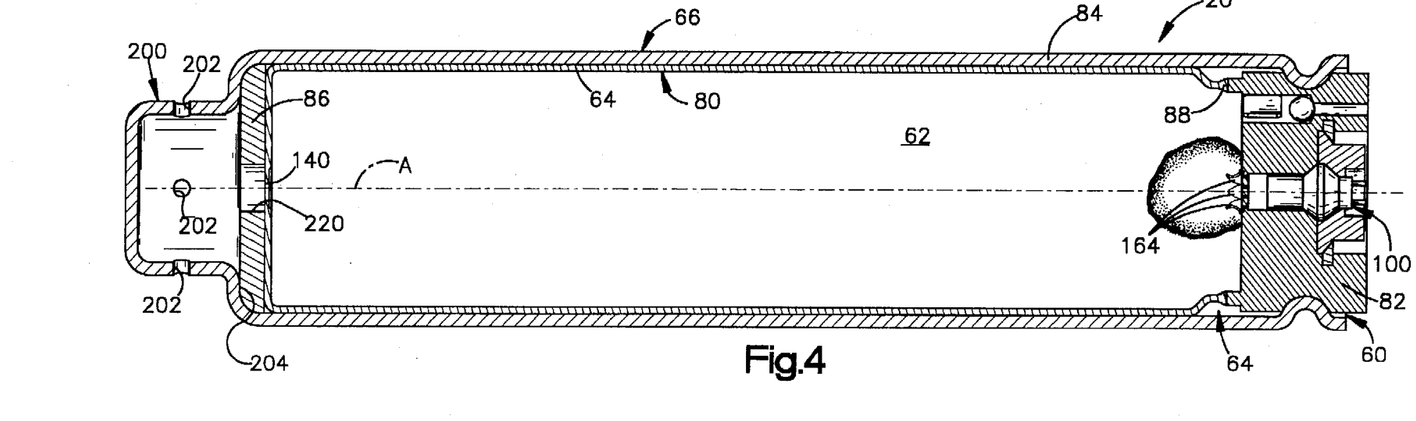
FIGS. 4–6 are views similar to FIG. 1 illustrating parts of the inflator in different conditions.

In operation, when the sensor 46 senses a vehicle condition for which inflation of the air bag 22 is desired, the switch 44 closes to actuate the igniter 100. The igniter 100, when actuated, produces combustion products, including heat and pressure, in the chamber 162. The member 164 ruptures in response to the increasing pressure within the chamber 162, as illustrated in FIG. 4. Combustion products flow from the chamber 162, through the flow passages 160 and into the chamber 62 to ignite the hydrogen fuel gas in the mixture of gases.

Figure 5:
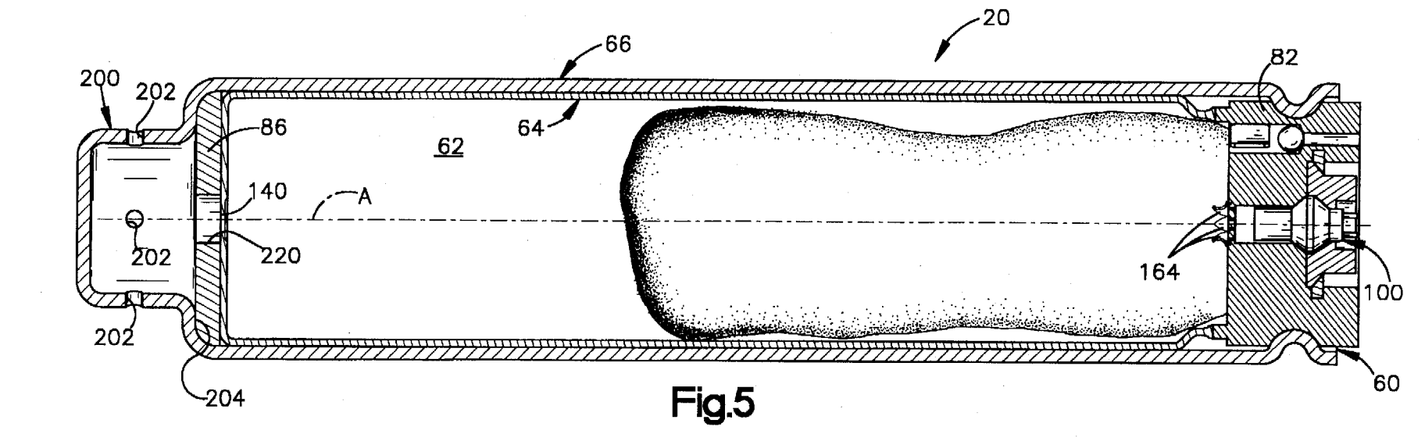
Figure 6:
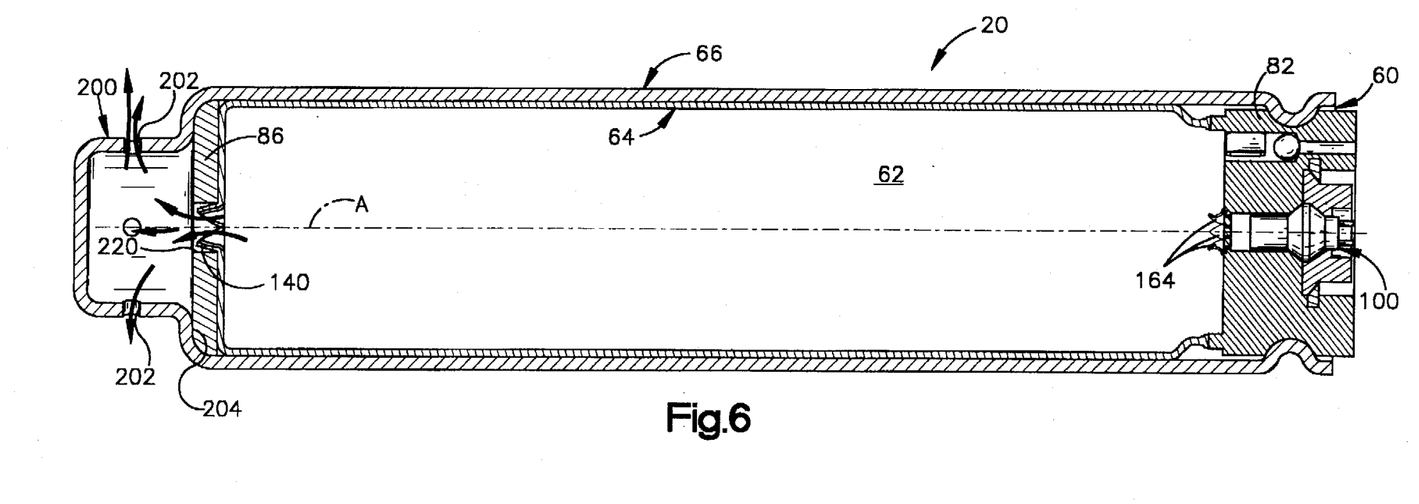

Combustion of the hydrogen fuel gas is supported by the oxidizer gas and propagates within the chamber 62, as illustrated in FIG. 5. Pressure within the chamber 62 increases due to the heat created by combustion of the hydrogen fuel gas. When the pressure within the chamber 62 reaches the predetermined pressure, the central portion 140 of the end wall 124 ruptures, as illustrated in FIG. 6. Gas flows from the chamber 62 through the opening 220 in the reinforcing wall 86. Gas then flows into the diffuser portion 200 of the outer housing 66 and is directed through the outlet openings 202 to inflate the air bag 22.

The inner housing 64 of the inflator 20 provides advantages over glass liners. One advantage is that the relatively thin stainless steel or aluminum material of the inner shell 80 is readily available and is easily workable into a desired size and shape that fits tightly within the outer housing 66 during an assembly operation. Another advantage is that the inner shell 80 of the present invention is easily attached to the end cap 82 to form a hermetic seal by a friction welding operation that could not be accomplished feasibly with glass liners. Another advantage is that the inner shell 80 is not easily breakable like glass liners. Another advantage is that the inner shell 80 does not have to be applied or adhered to the outer shell 84 as a glass liner would probably have to be. Yet another advantage is that if a hole or crack develops in the inner shell 80, the outer shell 84 serves as a secondary structural member so the mixture of gases merely leaks from the container 60 without the container suddenly bursting.

Figure 7:
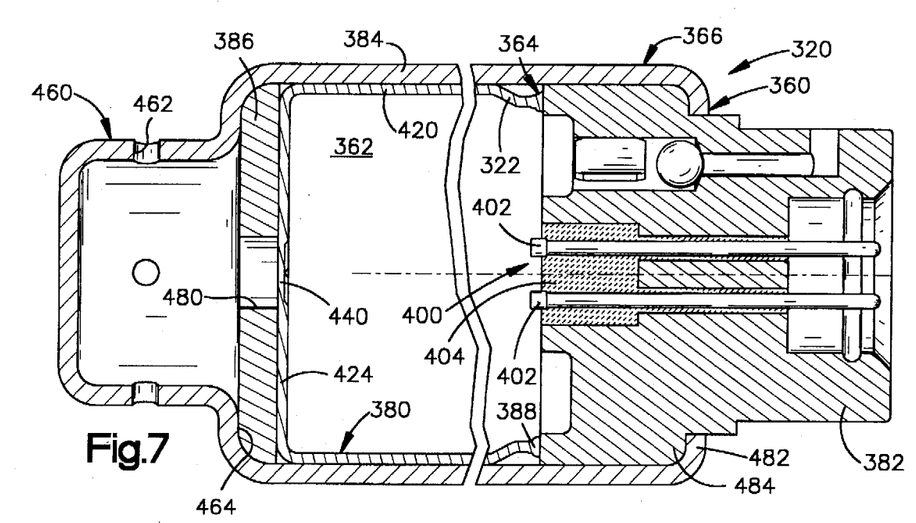
FIG. 7 is a schematic sectional view of a second embodiment of an air bag inflator constructed according to the present invention.

An inflator 320, constructed according to another embodiment of the present invention, is illustrated in FIG. 7. The inflator 320 is similar in construction and operation to the inflator 20, illustrated in FIGS. 1–6. The inflator 320 includes a container 360 which defines a chamber 362. A mixture of gases, which is identical to the mixture of gases in the inflator 20, is stored under pressure in the chamber 362. The room temperature pressure at which the mixture of gases is stored in the chamber 362 is at least about 4,000 psi and is preferably about 4,500 psi.

The container 360 includes an inner housing 364 and an outer housing 366. The inner housing 364 includes a tubular inner shell 380 that is closed at one end and an end cap 382. An open end of the inner shell 380 is fixed to the end cap 382 by a friction weld 388. The inner shell 380 and end cap 382 cooperate to define the chamber 362. The outer housing 366 includes a tubular outer shell 384 and a reinforcing wall 386.

An igniter 400 is supported by the end cap 382. The igniter 400 is connected to an electrical actuation circuit (not shown) and is actuatable to ignite the fuel gas in the mixture of gases. The igniter 400 is a "spark gap" type of igniter and includes a pair of electrodes 402 located in electrically insulating material 404, such as glass, which is chemically unreactive with the hydrogen fuel gas in the mixture of gases. The insulating material 404 spaces and electrically insulates the electrodes 402 from each other and from the end cap 382. The insulating material 404 also forms a hermetic seal between the chamber 362 and the exterior of the inner housing 364. When an electrical signal is provided to the electrodes 402, a spark arcs across the space between the electrodes to ignite the hydrogen fuel gas in the mixture of gases.

The inner shell 380 is made from a material which is chemically unreactive with the hydrogen fuel gas of the mixture of gases stored in the chamber 362, such as stainless steel or aluminum. The end cap 382 is also made from a material that is chemically unreactive with the hydrogen fuel gas of the mixture of gases, such as stainless steel or aluminum. The inner shell 380 includes a tubular wall 420 which is open at an end 422, to the right as viewed in FIG. 7, prior to being welded to the end cap 382. The other end of the inner shell 380, to the left as viewed in FIG. 7, is closed by an end wall 424. The wall 424 is formed in one piece with the tubular wall 420 of the inner shell 380 during a drawing operation.

The inner shell 380 has a nominal thickness which is not greater than about 1.0 mm (0.039 inch) and is preferably about 0.81 mm (0.032 inch). The outer shell 384 has a nominal thickness which is at least approximately 1.5 times the nominal thickness of the inner shell 380. The thickness of the outer shell 384 is preferably at least 1.5 mm (0.059 inch).

The end wall 424 of the inner shell 380 has a rupturable central portion 440. The central portion 440 may be stamped to have a thickness which is less than the nominal thickness of the remainder of the inner shell 380. The central portion 440 ruptures in response to pressure in the chamber 362 increasing to a predetermined pressure. The predetermined pressure is approximately at least twice the room temperature pressure at which the mixture of gases is stored and is preferably approximately 10,000 psi.

The outer housing 366 is preferably made from a relatively strong, easily workable and relatively low cost material, such as carbon steel. The outer housing 366 is formed into a size and shape which fits closely over the inner shell 380. When the inner housing 364 is pressurized with the mixture of gases, an outer surface of the inner housing abuts and engages an inner surface of the outer housing 366 over the axial and circumferential extents of the tubular wall 420 of the inner shell 380. Thus, the outer housing 366 reinforces the tubular wall 420 and bears a portion of the load acting on the tubular wall 420 due to pressure in the chamber 362 of the inner housing 364.

The outer shell 384 includes a diffuser portion 460 that is smaller in diameter than the rest of the outer shell. The diffuser portion 460 of the outer shell 384 includes a plurality of outlet openings 462 through which the gas from the chamber 362 flows to inflate the air bag. The outer shell 384 also includes an annular shoulder 464 that extends radially inward adjacent the diffuser portion 460.

The shoulder 464 of the outer shell 384 engages the reinforcing wall 386, which is made from a suitable material, such as carbon steel. The reinforcing wall 386 engages the end wall 424 of the inner shell 380 to limit movement of the inner housing 364 in a direction to the left, as viewed in FIG. 7, relative to the outer housing 366 and reinforce the end wall 424 of the inner shell 380.

A central opening 480 is formed in the reinforcing wall 386 in alignment with the rupturable central portion 440 of the inner housing 364. Gas flows through the opening 480 in the reinforcing wall 386 after the central portion 440 of the inner shell 380 ruptures. The opening 480 in the reinforcing wall 386 has a predetermined diameter to meter the flow of gas into the diffuser portion 460.

The end portion 482 of the outer shell 384, to the right as viewed in FIG. 7, is deformed over a flange portion 484 of the end cap 382 to maintain the inner housing 364 in a desired relative position within the outer housing 366. This also maintains the end wall 424 of the inner shell 380 engaged with the reinforcing wall 386 and assures that the reinforcing wall is in engagement with the annular shoulder 464 of the outer shell 384.

Figure 8:
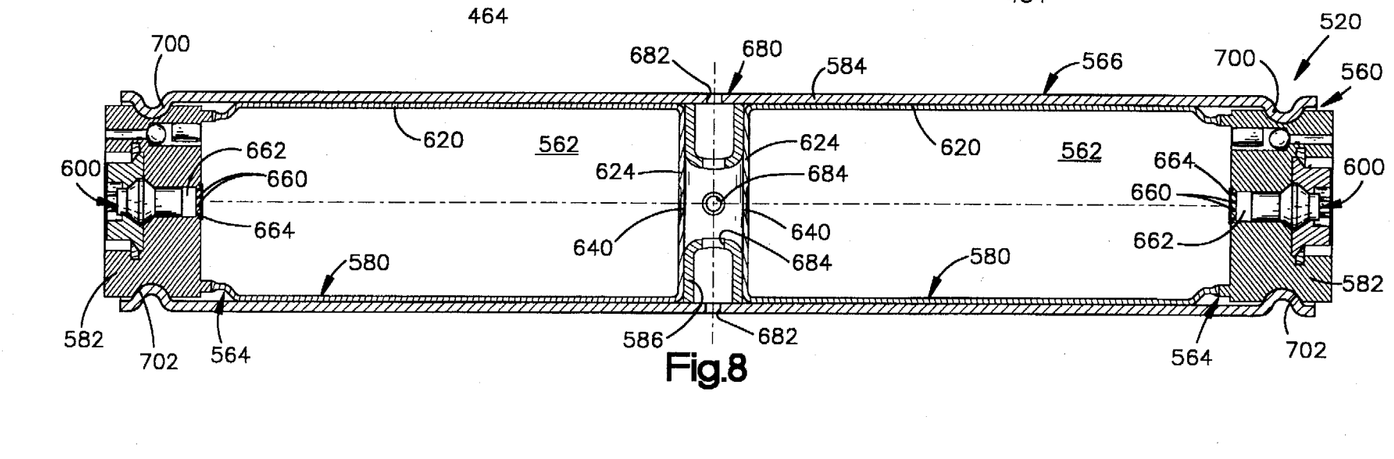
FIG. 8 is a schematic sectional view of a third embodiment of an air bag inflator constructed according to the present invention.

An inflator 520, constructed according to yet another embodiment of the present invention, is illustrated in FIG. 8. The inflator 520 is similar in construction and operation to the inflators 20, 320, illustrated in FIGS. 1–7 and described above. The inflator 520 is suitable for use in an inflatable vehicle passenger protection system which can be mounted in an instrument panel of the vehicle. However, the inflator 520 could be used anywhere in a vehicle where a relatively large volume of inflation fluid is desired to inflate an air bag.

The inflator 520 includes a container 560 which defines a pair of chambers 562. Each chamber 562 stores a mixture of gases under pressure. The mixture of gases is identical to the mixture of gases described above. The room temperature pressure at which the mixture of gases is stored in each chamber 562 is at least about 4,000 psi and is preferably about 4,500 psi.

The container 560 includes a pair of inner housings 564 and an outer housing 566 which supports both inner housings. The inner housings 564 are identical in construction to each other and to the inner housing 64, illustrated in FIGS. 1–6 and described above. Each inner housing 364 includes a tubular inner shell 580 and an end cap 582. The outer housing 566 includes a tubular outer shell 584 and a central reinforcing wall 586.

Each inner shell 580 is fixed to the respective end cap 582 by a friction weld. An igniter 600 is provided for each inner housing 564. Each igniter 600 is supported by the respective end cap 582, is connected to an electrical actuation circuit 40, and is actuatable to ignite the fuel gas in the mixture of gases.

Each inner shell 580 includes a tubular wall 620 that is friction welded to the end cap 582. At its end opposite the end cap 582, each inner shell 580 has an end wall 624 formed in one piece with the tubular wall 620. The end walls 624 of the inner shells 580 are located on opposite sides of and in engagement with the central reinforcing wall 586. Each inner shell 580 is made from a material which is chemically unreactive with the hydrogen fuel gas in the mixture of gases. This material is preferably stainless steel or aluminum.

The outer shell 584 has a nominal thickness which is approximately 1.5 times the nominal thickness of the inner shells 580. The thickness of the outer shell 584 is preferably at least 1.5 mm (0.059 inch). Each inner shell 580 has a nominal thickness which is no greater than about 1.0 mm (0.039 inch) and is preferably about 0.81 mm (0.032 inch).

Each end wall 624 of the inner shells 580 has a rupturable central portion 640. The central portion 640 may have a thickness which is less than the nominal thickness of the remainder of the inner shell 580. The central portion 640 ruptures in response to pressure in the chamber 562 increasing to a predetermined pressure. Preferably, the predetermined pressure is approximately at least twice the room temperature pressure at which the mixture of gases is stored and is preferably about 10,000 psi.

Each end cap 582 is also made from a material that is chemically unreactive with the hydrogen fuel gas in the mixture of gases. Preferably, each end cap 582 is made from aluminum or stainless steel. Each end cap 582 includes a plurality of flow passages 660 for fluidly communicating a chamber 662 in the end cap with the respective chamber 562. The passages 660 in each end cap 582 are covered by a relatively thin member 664. The member 664 extends across all of the passages 660 to block fluid flow between the chamber 562 and cap chamber 162. The member 664 ruptures in response to actuation of the igniter 600. Combustion products flow from the chamber 662, through the flow passages 660 and into the chamber 562 to ignite the hydrogen fuel gas in the mixture of gases.

The outer housing 566 is preferably made from a relatively strong, easily workable and relatively low cost material, such as carbon steel. The outer housing 566 is formed into a size and shape which fits closely over the inner shells 580. When the inner shells 580 are pressurized with the mixture of gases, the external surface areas of the inner shells abut and engage an inner surface of the outer shell 584. The tubular walls 620 of the inner shells 580 are thus supported and reinforced by the outer housing 566 over their axial and circumferential extents. The outer housing 566 thus bears a portion of the load acting on the tubular walls 620 due to the pressure in the chambers 562.

The outer housing 566 includes a central diffuser portion 680 located around the central reinforcing wall 586. The diffuser portion 580 of the outer housing 566 includes a plurality of outlet openings 682. The central reinforcing wall 586 engages the outer shell 584 and the end walls 624 of the inner shells 580 to limit movement of the inner housings 580 toward one another and relative to the outer housing 566. The central reinforcing wall 586 engages and supports the end walls 624 of the inner shells 580 except in the area of the rupturable portions 640 of the inner shells.

The central reinforcing wall 586 also includes openings 684. Fluid from the chambers 562 flows through the openings 684 in the central reinforcing wall 586 after the rupturable portions 640 of the inner shells 580 rupture. Fluid then flows through the outlet openings 682 in the outer housing 566 to inflate the air bag.

Opposite end portions 700 of the outer housing 566 are deformed to fit into respective grooves 702 formed in the end caps 582. The engagement between the deformed end portions 700 and the surfaces defining the grooves 702 maintain the inner housings 564 in a desired relative position within the outer housing 566. The deformed end portions 700 and the grooves 702 thus maintain the end walls 624 of the inner shells 580 engaged with the central reinforcing wall 586 of the outer housing 566.

In operation, the igniters 600 are actuated to produce combustion products which are directed into the chambers 662 and rupture the members 664. The combustion products enter the chambers 562 to ignite the hydrogen fuel gas in the mixture of gases. Pressure within each chamber 562 increases due to combustion of the hydrogen fuel gas which is supported by the oxidizer gas in the mixture of gases. When the pressure within each chamber 562 reaches the predetermined pressure, the rupturable portion 640 of each inner shell 580 ruptures.

Gas from the chambers 562 flows through the openings 684 in the central reinforcing wall 586. Gas then flows through the outlet openings 682 in the diffuser portion 680 of the outer housing 566 to inflate the air bag. It will be apparent that the igniters 600 could be actuated simultaneously or at different times to provide a tailored pressure in the air bag as a function of time.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for inflating an inflatable vehicle occupant protection device, said apparatus comprising:
   means for storing gas for inflating the protection device, said means including a container defining a chamber;
   fluid in said chamber, said fluid comprising a combustible fuel gas;
   said container including:
   an inner housing comprising an inner member extending along an axis, said inner member having a first surface portion defining said chamber and a second surface portion defining at least a portion of the periphery of said inner member extending along the axis of said inner member; and
   an outer housing comprising an outer member with a third surface portion engaging and supporting said second surface portion of said inner member over its axial and circumferential extents;
   means for igniting said fuel gas to create heat; and
   means for directing gas from said chamber to the protection device.

2. The apparatus of claim 1 wherein a portion of one of said inner and outer housings is deformed to engage a portion of the other of said inner and outer housings to maintain said inner and outer housings in a predetermined relative position.

3. The apparatus of claim 1 wherein said inner member is made from one of stainless steel and aluminum.

4. The apparatus of claim 3 wherein said outer member is made from carbon steel.

5. The apparatus of claim 1 wherein said inner housing further comprises a portion which ruptures in response to pressure in the chamber increasing to a predetermined pressure due to the heat created by ignition of said fuel gas.

6. The apparatus of claim 1 wherein said inner member comprises a tubular portion extending along the axis and an end wall portion closing an end of said tubular portion, and said outer housing comprises a wall engaging and supporting said end wall portion of said inner member, said third surface being a surface of a tubular portion of said outer housing.

7. An apparatus for inflating an inflatable vehicle occupant protection device, said apparatus comprising:
   a container defining a chamber;
   a mixture of gases in the chamber, said mixture of gases including a fuel gas and an inflation gas; and
   means for igniting said fuel gas to heat and pressurize said inflation gas in the chamber;
   said container comprising:
   an inner housing including an inner member having a first surface defining the chamber and a second surface defining an exterior periphery of said inner housing, said inner member being made from a metal which is chemically unreactive with said fuel gas, said inner member having a portion which ruptures in response to pressure in the chamber increasing to a predetermined pressure to provide an opening for gas to flow from said chamber; and
   an outer housing including an outer member having a third surface engaging and supporting said second surface of said inner member to reinforce said inner member against pressure in the chamber except at said portion; and
   means for directing gas flowing from the opening in said inner member to the protection device to inflate the protection device.

8. The apparatus of claim 7 wherein said inner member is made from one of stainless steel and aluminum.

9. The apparatus of claim 7 wherein said outer member is made from carbon steel.

10. The apparatus of claim 7 wherein said inner housing further includes a cap fixed to said inner member to define the chamber and support said igniting means.

11. The apparatus of claim 7 wherein said inner member has a nominal first thickness and said outer member has a nominal second thickness being at least 1.5 times said first thickness.

12. The apparatus of claim 11 wherein said first thickness is not greater than about 1.0 mm and said second thickness is at least about 1.5 mm.

13. The apparatus of claim 7 wherein said inner member includes a tubular portion and an end wall closing an end of said tubular portion, said end wall having said portion which ruptures.

14. The apparatus of claim 13 wherein said outer housing includes a reinforcing wall supporting a portion of said end wall, said reinforcing wall including means for defining said portion of said inner member which ruptures.

15. The apparatus of claim 7 wherein a portion of one of said inner and outer housings is deformed into engagement with a portion of the other of said inner and outer housings to inhibit relative movement between said inner and outer housings.

16. An apparatus for inflating an inflatable vehicle occupant protection device, said apparatus comprising:
   a fluid including combustible fuel gas;
   a container defining a chamber for holding said fluid, said container comprising:
      an inner housing including an inner member with a cylindrical first surface portion defining the chamber and a cylindrical second surface portion defining at least a portion of a periphery of said inner member, said inner member having a rupturable portion which ruptures in response to pressure in the chamber increasing to a predetermined pressure, said inner member being made from one of stainless steel and aluminum; and
      an outer housing including an outer member with a cylindrical third surface portion engaging and supporting said second surface portion of said inner member over the axial and circumferential extents of said inner member, said housing having an opening located adjacent said rupturable portion of said inner member through which fluid in the chamber may flow upon said rupturable portion rupturing; and
   means for igniting said combustible fuel gas to increase the pressure in the chamber to the predetermined pressure.

17. The apparatus of claim 16 wherein said inner member has a nominal first thickness and said outer member has a nominal second thickness which is at least 1.5 times the first thickness.

18. The apparatus of claim 16 wherein a portion of said outer housing is deformed to engage a portion of said inner housing to maintain said inner member in a predetermined position relative to said outer member.

19. An apparatus for inflating an inflatable vehicle occupant protection device, said apparatus comprising:
   a container defining a chamber for inflation fluid which is used to inflate the protection device, said container comprising:
      an inner housing comprising an inner member extending along an axis, said inner member having a first surface portion defining at least a portion of the chamber and a second surface portion defining at least a portion of the periphery of said inner member extending along the axis of said inner member, said inner housing further including a portion which ruptures in response to pressure in the chamber increasing to a first predetermined pressure; and
      an outer housing comprising an outer member with a third surface portion engaging and supporting said second surface portion of said inner member over its axial and circumferential extents, said outer housing further including a reinforcing wall supporting a portion of said inner member, said reinforcing wall including means for defining said portion of said inner member which ruptures; and
   actuatable means for effecting the heating of inflation fluid in the chamber to increase the pressure to the first predetermined pressure.

20. The apparatus of claim 19 wherein said inner housing further includes a cap fixed to said inner member to support said actuatable means, said cap including a plurality of passages to permit communication between said actuatable means and the chamber, a rupturable member fixed to said cap and extending across said plurality of passages to block communication between the chamber and said actuatable means when said member is unruptured, said member having sufficient strength to withstand pressure in the chamber which acts on a first side of said member and rupturing in response to actuation of said actuatable means to produce pressure which acts on a second side of said member opposite said first side.

21. The apparatus of claim 19 wherein a portion of one of said inner and outer housings is deformed to engage a portion of the other of said inner and outer housings to maintain said inner and outer housings in a predetermined relative position.

22. The apparatus of claim 19 further including inflation fluid which comprises a combustible fuel gas and an inflation gas, said inner member being made from a metal that is chemically unreactive with said fuel gas.

23. An apparatus for inflating an inflatable vehicle occupant protection device, said apparatus comprising:
   a container defining a chamber for inflation fluid which is used to inflate the protection device;
   actuatable means supported by said cap for effecting the heating of inflation fluid in the chamber; and
   said container comprising:
      an inner housing having a first surface portion defining at least a portion of the chamber;
      a cap fixed to said inner member to support said actuatable means, said cap including a plurality of passages to permit communication between said actuatable means and the chamber; and
      a rupturable member fixed to said cap and extending across said plurality of passages to block communication between the chamber and said actuatable means when said member is unruptured, said member having sufficient strength to withstand pressure in the chamber which acts on a first side of said member and rupturing in response to actuation of said actuatable means to produce pressure which acts on a second side of said member opposite said first side.

24. The apparatus of claim 23 wherein said inner housing further comprises an inner member extending along an axis, said inner member having a second surface portion defining at least a portion of the periphery of said inner member extending along the axis of said inner member, said inner member also having a portion which ruptures in response to pressure in the chamber increasing to a predetermined rupture pressure, said container further including an outer housing comprising an outer member with a third surface portion engaging and supporting said second surface portion of said inner member over its axial and circumferential extents, said outer housing further comprising a reinforcing wall supporting a portion of said inner member, said reinforcing wall including means for defining said portion of said inner member which ruptures.

25. The apparatus of claim 24 wherein a portion of one of said inner and outer housings is deformed to engage a portion of the other of said inner and outer housings to maintain said inner and outer housings in a predetermined relative position.

26. The apparatus of claim 24 wherein the inflation fluid comprises a combustible fuel gas and an inflation gas and said inner member is made from a metal that is chemically unreactive with the fuel gas.

* * * * *